Oct. 4, 1932. W. TAYLOR 1,880,297
FLUSHING APPARATUS
Original Filed March 18, 1929
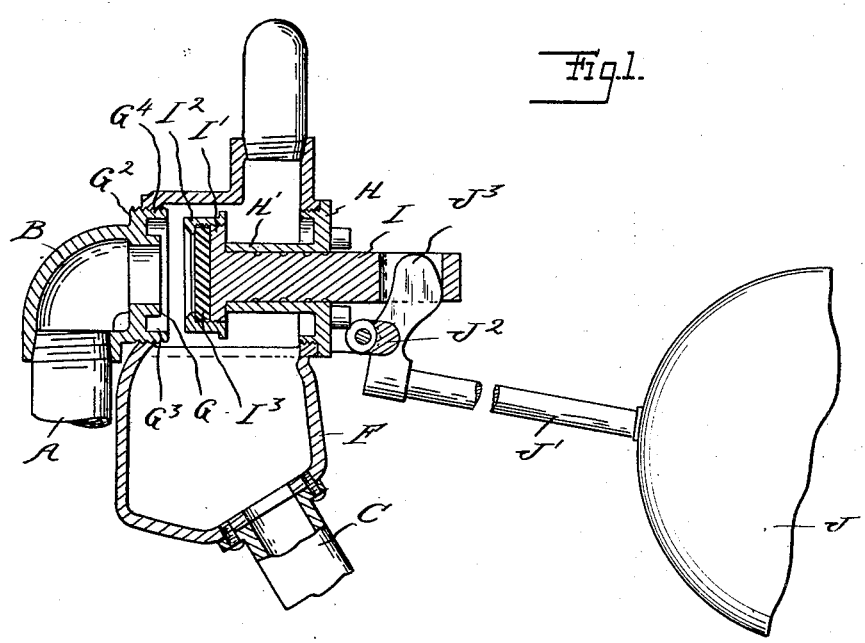
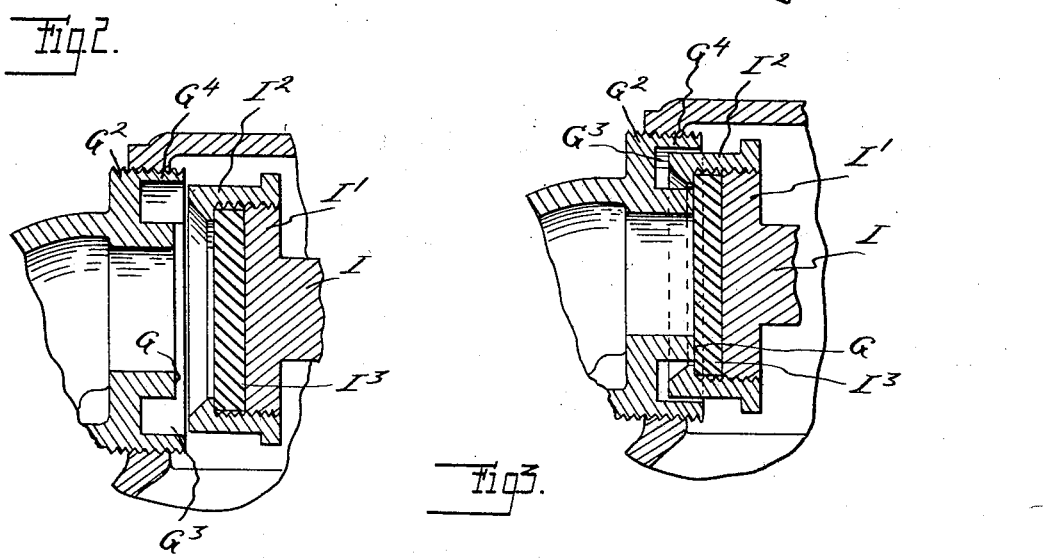
INVENTOR
William Taylor
BY Whittemore Hulbert
Whittemore & Belknap
ATTORNEYS Patented Oct. 4, 1932

1,880,297

UNITED STATES PATENT OFFICE

WILLIAM TAYLOR, OF WINDSOR, ONTARIO, CANADA, ASSIGNOR TO JAMES M. TEAHAN, OF DETROIT, MICHIGAN

FLUSHING APPARATUS

Original application filed March 18, 1929, Serial No. 348,642. Divided and this application filed March 22, 1930. Serial No. 438,228.

The invention relates to ball cocks such as are used in connection with the automatic filling of flushing tanks, and for other similar purposes. The present application is a division of an earlier filed application Ser. No. 348,642, filed March 18, 1929, and the invention consists in the construction as hereinafter set forth.

In the drawing:

Figure 1 is a longitudinal section through the ball cock;

Figures 2 and 3 are similar views showing parts in different positions of adjustments.

One of the chief difficulties interfering with the successful operation of a ball cock under the varying conditions of service is due to the fact that the valve is opened and closed by a float arm which is dependent for its operation on the fall or rise of water in the tank. Thus when the water in the tank approaches its high level the valve is so near its seat as to greatly restrict the flow of water into the tank. On the other hand, the valve cannot reach its final seating position until water is admitted to the tank to the predetermined level. Therefore, there is a lack of positive action with the further objection that during the final closing there is frequently a hissing noise due to the sucking in of air. This latter effect is intensified where, as in the specific construction illustrated, the discharge from the ball cock is provided with an air vent to avoid possibility of siphoning water from the tank into the line when the water pressure is shut off for any reason.

To overcome the above described defects, I have devised a construction of ball cock which will automatically effect a quick final closing of the valve, and the holding of the valve positively to its seat by a pressure in excess of any water pressure in the line, the construction being as follows: A is the water supply conduit which at its upper end is connected by an elbow fitting B with the casing F containing the valve, and C is the discharge conduit from this casing which empties into the tank or other receptacle to be filled. G is the seat for the ball cock preferably formed integral with the elbow fitting B, which fitting has a threaded head portion $G^2$ for engaging the casing F. This casing F has a cylindrical portion, one end of which is closed by the head $G^2$ while the opposite end is closed by a screw threaded cap H having an inwardly extending bearing $H'$ for the stem I of the disk valve head $I'$. The periphery of the disk $I'$ is threaded to receive an annular flanged member $I^2$ for securing to said head a standard valve disk $I^3$, the arrangement being such that the inward movement of the stem I will press the disk $I^3$ against the seat G. Surrounding the seat G is an annular recess $G^3$ which in turn is surrounded by an annular wall $G^4$ of an internal diameter approximately fitting the external diameter of the member L. The construction is such that before the disk $I^3$ reaches the seat G the member $I^2$ will enter the annular space $G^3$ in such close proximity to the wall $G^4$ as to greatly restrict the passage of water. Consequently the pressure of water within the annular passage $G^3$ will rise and by acting upon the area of the disk $I^3$ outside of the seat G will greatly increase resistance to further closing of the valve. The valve is closed by the operation of a float or ball J having an arm $J'$ connected to a rocker $J^2$ pivotally connected to the casing F and having a rock arm $J^3$ engaging a slotted bearing in the stem I. Thus the rise of the float J will gradually move the stem I and members $I'$, $I^2$ and $I^3$ inward until the restriction of discharge from the passage $I^3$, whereupon the increased pressure acting upon the disk $I^3$ will temporarily hold the float from further rise. In other words, the water in the tank will continue to rise with a greater depression of the float J therein until the increased buoyancy will overcome the added resistance. The valve will then resume its inward movement toward the seat G and by restricting the flow of water into the annular passage $G^3$ will permit the pressure in the latter to drop. This lessens the total resistance to the movement of the valve and permits the float to quickly rise to its normal depression beneath the surface of the water, thereby completing the closing of the valve. The total effect is to permit a fairly free discharge of water from the ball cock into the tank up to the point of arrest of the float and then to quickly complete the closing and to hold the valve closed under pressure of the float. This avoids on the one hand any sucking in of air with the final discharge of water and on the other hand an incomplete closing of the valve. The valve stem I has a loose fit within the bearing H', but is provided with a series of annular grooves which form a water packing restricting escape of water around the stem. This avoids danger of the stem sticking in the bearing, thus rendering the valve inoperative.

The construction as described is free from any danger of incomplete closing of the valve and the consequent continued running of water into the tank to be wasted through the overflow. It also avoids the slow final operation in filling the tank or the sucking of air, these being common defects with ball cocks of usual construction.

What I claim as my invention is:

1. A ball cock for filling a tank comprising a valve seat, a valve for engaging said seat, float actuated mechanism for closing said valve against the hydrostatic pressure of the water in said conduit and means operating at a predetermined point in the closing movement of said valve for increasing the effective hydrostatic resistant pressure thereon to a predetermined extent to momentarily delay further closing of the valve and rise of the float, whereby the increased lifting power on the float will effect a quick final closing movement of the valve.

2. A ball cock for controlling the filling of a tank comprising a valve seat, a disk valve of larger area than said seat, float actuated mechanism for closing said valve against said seat, a member located to surround said valve at a predetermined point in the closing movement thereof in such close peripheral proximity thereto as to produce a predetermined resistance to the discharge of water, and a predetermined increase in resistant pressure to the closing of the valve to momentarily delay further movement thereof, said increased pressure being relieved when said valve is in close proximity to its seat whereby a quick final closing movement is effected.

3. A ball cock for filling a tank comprising a water discharge conduit having a valve seat surrounding the discharge orifice, a disk valve of greater area than said seat, float actuated mechanism for closing said valve against its seat, an annular wall surrounding said seat and located to be in peripheral proximity to said valve at a predetermined point in the closing movement thereof to produce a predetermined restriction to the escape of water and increase in resistant pressure to the closing of the valve whereby the closing of said valve is first retarded and then accelerated.

4. A ball cock for filling a tank comprising a water discharge conduit having an annular seat surrounding the discharge aperture and a concentric annular wall surrounding said seat and projecting slightly beyond the same, and a disk valve of an area but slightly less than the opening within said annular wall to produce a restriction in the water discharge at a predetermined point in the closing movement whereby said movement is momentarily retarded and then accelerated in its final closing movement.

5. A ball cock for filling a tank comprising a water discharge conduit having an annular seat surrounding the discharge aperture and a concentric wall surrounding said seat spaced therefrom and projecting slightly beyond the plane thereof, a plunger valve having a disk head of an area to loosely fit within said annular wall at a predetermined point in the closing movement to produce a predetermined restriction to the discharge of water and a float actuated mechanism for moving said plunger towards said valve seat whereby the restriction to the discharge will momentarily delay movement of said valve and effect a quick final closing against its seat.

In testimony whereof I affix my signature.

WILLIAM TAYLOR.